(12) United States Patent
Eddey et al.

(10) Patent No.: US 8,936,198 B1
(45) Date of Patent: Jan. 20, 2015

(54) TAG-BASED STATUS REPORTING IN DATA CENTERS

(75) Inventors: Matthew J. Eddey, Western Cape (ZA); Jacob Gabrielson, Seattle, WA (US); Matthew Paul Baranowki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 13/335,542

(22) Filed: Dec. 22, 2011

(51) Int. Cl.
*G06K 19/00* (2006.01)

(52) U.S. Cl.
USPC .......................................... 235/492; 235/487

(58) Field of Classification Search
USPC ................................................ 235/487, 492
See application file for complete search history.

(56) References Cited

U.S. PATENT DOCUMENTS

| | | |
|---|---|---|
| 5,959,275 A | 9/1999 | Hughes et al. |
| 2005/0246436 A1 | 11/2005 | Day et al. |
| 2007/0043536 A1 | 2/2007 | Tonack et al. |
| 2009/0072977 A1 | 3/2009 | Johnson et al. |
| 2010/0217723 A1* | 8/2010 | Sauerwein et al. ........... 705/337 |
| 2011/0298607 A1* | 12/2011 | Priyantha et al. ............ 340/505 |

OTHER PUBLICATIONS

Office action for U.S. Appl. No. 13/335,574, mailed on Mar. 21, 2013, Gabrielson et al., "Collaborative Resource Identification in Data Centers", 13 pages.
Office Action for U.S. Appl. No. 13/335,574, mailed on Aug. 27, 2013, Gabrielson et al., "Collaborative Resource Identification in Data Centers", 13 pages.
Office Action for U.S. Appl. No. 13/335,574, mailed on Dec. 17, 2013, Jacob Gabrielson, "Collaborative Resource Identification in Data Centers", 12 pages.
Office action for U.S. Appl. No. 13/335,574, mailed on Sep. 11, 2014, Gabrielson et al., "Collaborative Resource Identification in Data Centers", 19 pages.

* cited by examiner

*Primary Examiner* — Matthew Mikels
(74) *Attorney, Agent, or Firm* — Lee & Hayes, PLLC

(57) ABSTRACT

In a data center containing numerous computer resources, a technician may use mobile device to scan an identification tag associated with a particular resource. In response, the operational status of the resource is determined and reported to the technician. Status information from different resources may be normalized for viewing by different types of support personnel in a common format.

26 Claims, 3 Drawing Sheets

TAG-BASED STATUS REPORTING IN DATA CENTERS

BACKGROUND

It has become common for various types of online service providers to implement data centers having large numbers of computers and associated resources. In some situations, a data center may be built to provide particular services that are associated with a website or entity. In other situations, a data center may support a number of services that are associated with various websites and different entities. In some situations, network-accessible data centers may provide relatively low level computing resources that can be utilized by developers and other customers for various purposes on a pay-per-use basis.

A data center consists of a large number of similar or identical computers, which can communicate with each other and with other devices over a network. The network may include a local-area network and/or a wide-area network such as the Internet. The computers may be treated as fungible, with different jobs or workloads being dynamically assigned to available computers.

Administration and support for large data centers increasingly involves a number of different support personnel. Furthermore, different support personnel may be located in different parts of the world, even when they are supporting resources within the same data center. For example, local support technicians may be located within the data center itself and may have physical access to the resources within the data center. Other support personnel, however, may access and support the data center from remote locations.

Different support personnel may also use different administrative support tools, and may view collections of resources in vastly different ways. Local technicians may tend to think in terms of physical machines and their physical locations, for example, while higher-level analysts may think in terms of logical or programmatic properties.

Furthermore, different support tools used by different types of support personnel may present information in different ways, and may refer to various properties and parameters in different ways. This can make it challenging for analysts and technicians to collaborate, especially when they are located in different places and are not communicating in person.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes, in part, architectures and techniques for supporting data center management and administration. A local support technician may use a handheld device to physically scan a data center resource. For example, the technician may scan a barcode affixed to the resource. In response, various sources may be queried to determine the current operational status of the resource. This information may be normalized and presented to the technician on the display of the technician's handheld device. The same normalized information may also be displayed to other support personnel, so that all of the parties can work from a common set of information regarding the resource.

Figure 1:
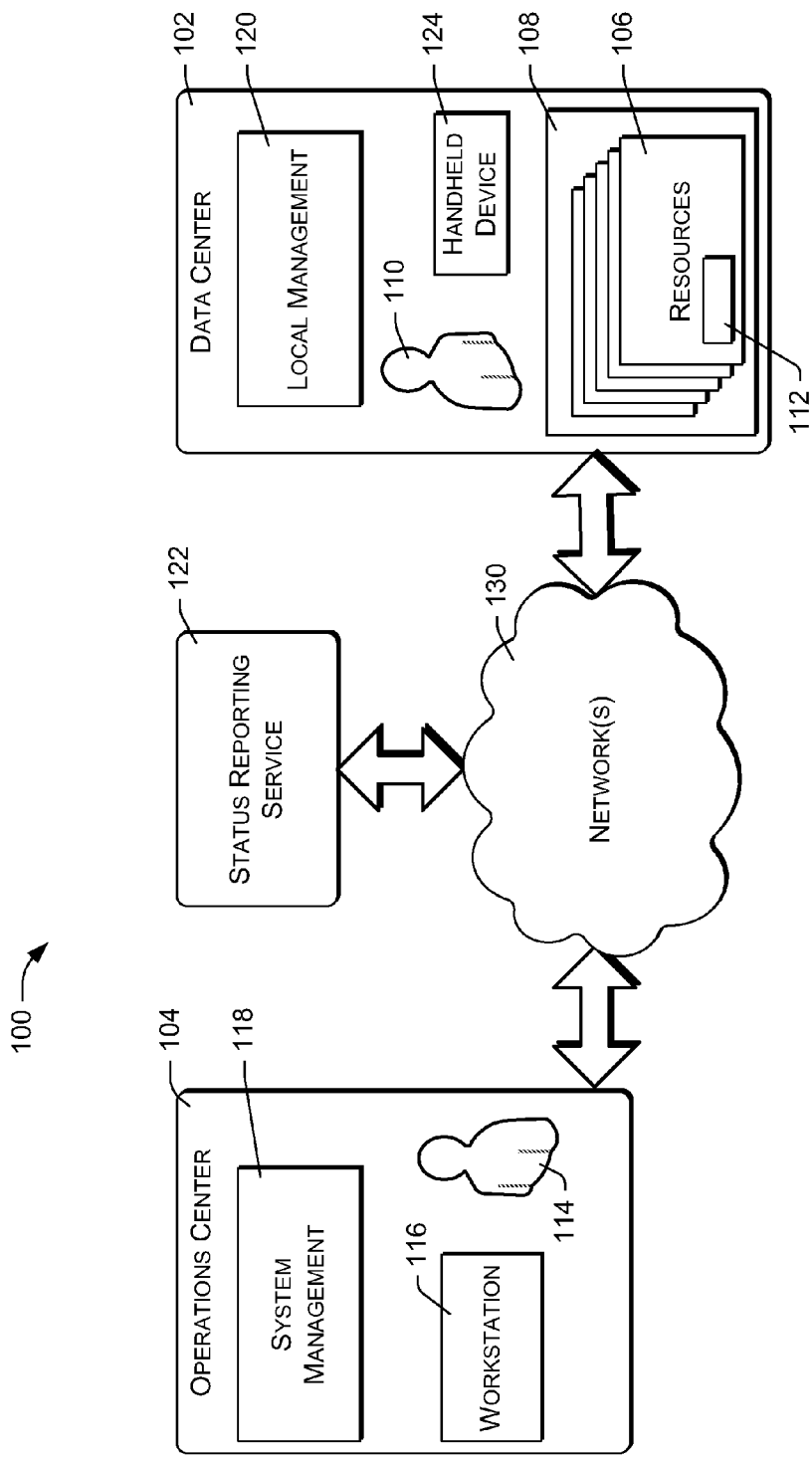
FIG. 1 is a block diagram illustrating a data center environment in which remote analysts collaborate with local technicians to manage and maintain data center resources.

FIG. 1 shows an example environment 100 in which the described techniques may be implemented. The example environment 100 includes a data center 102 and a physically and/or geographically remote operations center 104.

The data center 102 may be a physical facility that houses multiple resources 106, such as computers, telecommunications devices, networking components, power supplies, cooling equipment, and so forth. The resources 106 may be housed in rows or grids of similar or identical equipment racks 108, and the equipment racks themselves may be considered to be resources. The data center 102 may be housed in a room, a building, or a compound that includes multiple rooms or buildings.

The data center 102 may be staffed by one or more local support personnel 110, who will be referred to as support technicians 110 in the following discussion. The data center support technicians 110 have physical access to the data center 102, to the equipment racks 108, and to individual resources 106 within the data center 102.

The racks 108 and other resources 106 may be visually and/or electronically labeled with various tags or identifiers 112, which may include serial numbers, barcodes, names, identification numbers, RFID (radio-frequency identification) tags, MAC (media access control) addresses, and other identifiers. The technicians 110 may have access to maps and other types of documentation that assist in determining the locations of specific resources.

The operations center 104 may be staffed by one or more remote system operations personnel 114, who will be referred to as analysts 114 in the following discussion. The analysts 114 may not have physical access to the data center 102, and may in some cases be located remotely from the data center 102, such as in a distant geographic location.

The remotely located analysts 114 may have high-level responsibility for operations of various systems and functions that utilize the resources 106 of the data center 102, and may be responsible for diagnosing and correcting problems that arise from time to time in conjunction with data center resources 106. For example, the analysts 114 may respond to incident reports or support tickets that are generated in response to detected problems.

The analysts 114 may have workstations 116 that operate in conjunction with one or more system management components 118 to monitor, manage, and administer the resources 106 that are physically located within the data center 102. In practice, the illustrated system management component 118 may comprise numerous functional elements, or may be a high-level component that interacts with multiple lower-level management components. Management components may include diagnostic and control functionality executing on different resources, as well as multiple dedicated-function management and administrative components. Different components and devices that contribute to or are used by the system management component 118 may be located on different networks and in different geographic locations, and may in some cases be located within the data center 102 rather than within the operations center 104.

The data center 102 may have a local management system or component 120 that is used by the data center technicians 110 to manage aspects of the data center 102. The local management system 120 may specify various characteristics of resources such as identifications, capabilities, operating parameters, network communications settings, locations, options, and so forth.

The system management component 118 and local management component 120 are representative of various different and possibly complex management and administrative components and subcomponents that may be used within and across different types of facilities and organizations. Environments such as shown in FIG. 1 may in practice have many more management and reporting components than shown. Such components may have overlapping functionality, and different management components may share and use information from the same resources and sub-components. Furthermore, the resources 106 themselves typically have reporting and administrative capabilities, and may form a part of or participate with the administrative components and functionality of the data center 102.

The management and administrative components of the data center 102 may also include a status reporting service 122. The status reporting service 122 may be implemented alone or in conjunction with other system administrative components, and may be located in the data center or remotely from the data center. The status reporting service 122 provides services that may be used by other management and administrative components, as well as by various support personnel such as the analysts 114 and the technicians 110. For example, the analysts 114 may access the status reporting service 122 through their workstations 116. Similarly, the technicians 110 may have handheld devices or devices 124 that can be used to access the status reporting services 122.

The status reporting service 122 may have access to the various management systems and components of the operations center 104 and of the data center 102, including the system management component 118 and the local management component 120. The status reporting service 122 may also be able to query individual resources 106. Generally, the status reporting service 122 is configured to access or query various data center sources and components to determine operational status, including runtime status, of resources 106 within the data center 102.

The status reporting service 122 may in some implementations be accessed as a network-based server or web site, by browsers associated with the workstations 116 and the handheld devices 124. Alternatively, specialized client software may be installed on the workstations 116 and handheld devices 124, which may make appropriate network calls to the status reporting service 122 to provide and obtain information, as well as to request various services that may be provided by the status reporting service 122.

The status reporting service 122 may be implemented by one or more of various components that may be located in the operations center 104, the data center 102, or other locations. For example, the status reporting service 122 could in some embodiments be implemented as part of the system management component 118 or the local management component 120.

Communications between the various elements and components of FIG. 1, including communications within and between the operations center 104 and the data center 102, may be through one or more networks 126, which may include public and private networks as well as local-area and broad-area networks. The various networks 126 may include the Internet or may be implemented by more specialized communications mechanisms.

In the environment of FIG. 1, the status reporting service 122 may be used to provide operational status reports to data center support personnel such as the analysts 114 and the technicians 110. In operation, an analyst 114 may ask a technician 110 to perform maintenance actions or procedures on a particular data center resource 106. The technician 110 may locate the resource and scan its identification tag 112 using the handheld device 124 or equipment associated with the handheld device 124. The handheld device 124 may then communicate the resulting identification code to the status reporting service 122, which may respond by querying various administrative components and systems regarding the operational status of the located and scanned resource 106. For example, the status reporting service 122 may query the system management component 118, the local management component 120, the resource 106 itself, other resources 106, and/or other components, data stores, databases, services, and so forth that may have information about the resource 106. Resource operational information may include historical information such as service history, who has worked on the resource, whether there are any resolved or outstanding trouble tickets, and so forth. Historical information may also include status logs, including error and event logs, produced by the resources 106 or any associated management components.

After receiving status and/or diagnostic data about the resource 106, the status reporting service 122 may analyze and/or normalize the data. This may be particularly useful in situations where similar information is available from different sources and may otherwise be presented in varying ways, using different terminology and contexts. The status reporting service 122 can utilize a large amount of information, from various sources and/or services, and create a high-level report indicating or summarizing general operational status about the located resource.

The normalized information is returned to the handheld device 124 as a status report, where it is displayed for use by the technician 110. In addition, the status report may be sent or provided to the analyst 114.

Reported status may include a number of different types of information regarding a resource and its current, real-time operational condition or state, as well as historical information about the resource and any pending actions (such as work requests) that are to be performed with request to the resource. When the resource is a host or computer, for example, the status may indicate instances and/or processes running on the host or computer. Similarly, in an infrastructure as a service (IaaS) environment, the status may indicate customers using the resource, customers who are being supported by the resource, or non-identifying codes corresponding to such customers. Among other things, the reported and normalized status may indicate one or more of the following with respect to a resource:

number of customers using or being supported by the data center resource;
  customers using or being supported by the data center resource
  (customers may be identified by opaque identifiers or codes that do not reveal actual identity);
  whether the data center resource is being used;
  whether the data center resource can be worked on;
  whether the data center resource can be taken offline;

health of the data center resource;
network parameters of the data center resource;
hardware identification of the data center resource;
whether the data center resource is live;
performance metrics of the data center resource;
diagnostics associated with the data center resource;
metadata associated with the data center resource;
pending or requested actions that are to be taken with respect to the data center resource;
service, event, and error histories;
other historical data regarding the data center resource; or
log data associated with the data center resource.

Figure 2:
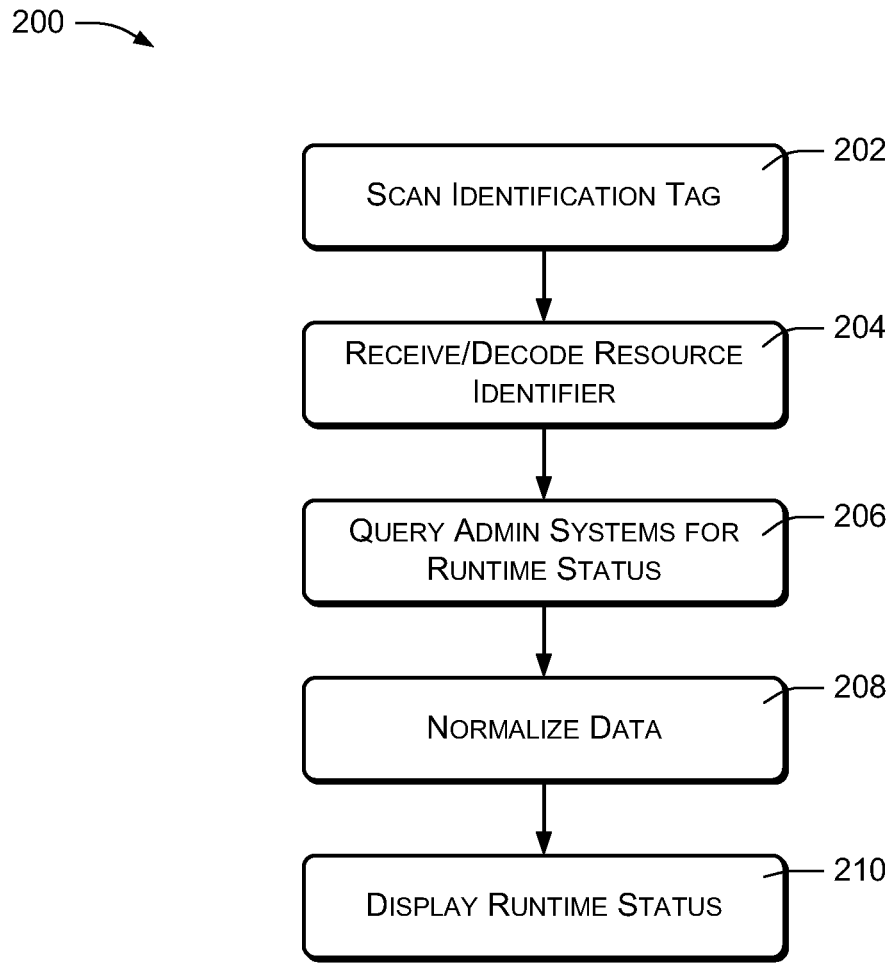
FIG. 2 is a flow diagram illustrating an example method of obtaining and displaying operational status information based on scanning physical resource identifiers associated with resources within a data center.

FIG. 2 illustrates an example method 200 that may be performed in conjunction with the environment 100 of FIG. 1 to determine and report resource status to various personnel of a data center or other similar installation. An action 202 comprises physically scanning an identification tag or label that is physically associated with a data center resource. As discussed above, the identification tag may be a radio tag, an optical tag such as a barcode or QR (quick response) code, a label, etc. The scanning may be performed using a mobile or handheld diagnostic device in physical proximity to the resource, such as by directing the focus of an optical scanner to a tag, label, or optical image affixed to the resource. The optical scanner may be an integral part of the mobile device, or may be a separate device that communicates with the mobile device. For example, the optical scanner may be part of an external device that communicates with the technician's mobile device using a wireless technology such as Bluetooth®.

An action 204 comprises receiving, determining, and/or decoding a resource identifier that has been scanned from a resource identification tag. This may comprise decoding a barcode or some other type of scanned data to determine the resource identifier. The action 204 may be performed by the technician's mobile device and/or by remote administrative components such as the local management component or status reporting service 122 of FIG. 1.

An action 206 comprises obtaining operational status information and/or data for the resource corresponding to the scanned resource identifier. This action may be based on at least in part on the resource identifier, and may comprise querying one or more data center administrative components. Queried data center administrative components may include the local management component 120 and the system management component 118 as represented in FIG. 1. The action 206 may also comprise querying administrative and diagnostic elements of individual resources 106.

An action 208 comprises normalizing the obtained operational status data for display to one or more data center personnel. Different resources may report similar parameters in different formats, using different units of measurement, and so forth. The action 208 may convert reported values into common units and formats, so that different types of personnel may view reported status in a common and uniform way.

An action 210 comprises displaying, reporting, or presenting the normalized operational status to one or more persons such as data center support personnel. In some embodiments, the action 210 may comprise displaying or presenting the normalized information to at least two support personnel.

Figure 3:
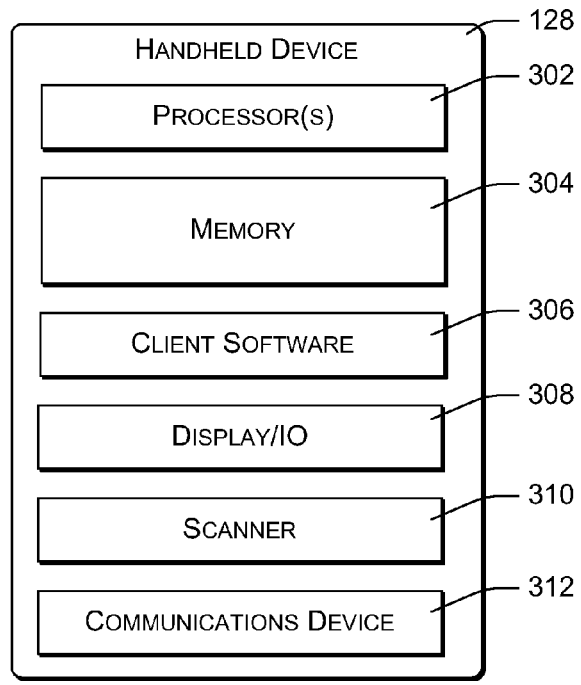
FIG. 3 is a block diagram of a mobile or handheld diagnostic device that may be used by a technician within a data center.

FIG. 3 illustrates relevant components of an example mobile or handheld diagnostic device 124. The handheld device 124 may be a general-purpose device upon which specialized applications can be installed for custom functionality, such as a smartphone, personal digital assistant (PDA), tablet computer, or similar device. In a very basic configuration, the example device 124 might comprise a processing unit 302 composed one of one or more processors, and memory 304. The memory 304 may comprise computer storage media and may include volatile and nonvolatile memory. Thus, the memory 304 may include, but is not limited to, RAM, ROM, EEPROM, flash memory, or other memory technology, or any other medium which can be used to store media items or applications and data which can be accessed by the device 124.

The memory 304 may be used to store any number of functional components that are executable on the processing unit 302, as well as data that is used by the functional components. Functionality components (not shown) may include an operating system, a web services component, application program interfaces (APIs) and various other components.

In particular, the handheld device 124 may include general or specialized client software 306 that is executable by the processor(s) 302 to implement the functionality described herein. In some cases, the client software may comprise an Internet browser or a similar interface, which may interact with the status reporting service 122 to facilitate the actions described with respect to FIG. 2. In other cases, the client software 306 may comprise more specialized client software, designed specifically for use in conjunction with the techniques described above.

Note that the various functionality described above may be distributed in various different ways between system components. Thus, the handheld device 124 may be configured to perform much of the described functionality, in addition to providing an interface to technicians 110 within the data center 102. Alternatively, much of the described functionality may be implemented by components other than the handheld device 124, and the handheld device 124 may be used primarily for user interaction.

The handheld device 124 may include a display and other I/O components 308. The handheld device 124 may include a scanner 310 such as an optical scanner, a barcode scanner, an RF scanner, or similar element that can be used by a technician to read, scan, and/or decode identifiers associated with resources within a data center. The scanner 310 may be part of the handheld device 124 or may be an external device that is associated with and/or communicates with the handheld device 124.

The handheld device 124 may also have a communications component or device 312, such as a network adapter, for communicating with the status reporting service 122 and other system components through the network 126. The communications component 312 may use wireless technology, including wireless networking technology.

The handheld device 124 may of course include many other logical, programmatic, and physical components, of which those shown in FIG. 3 are merely examples that are related to the discussion herein.

Figure 4:
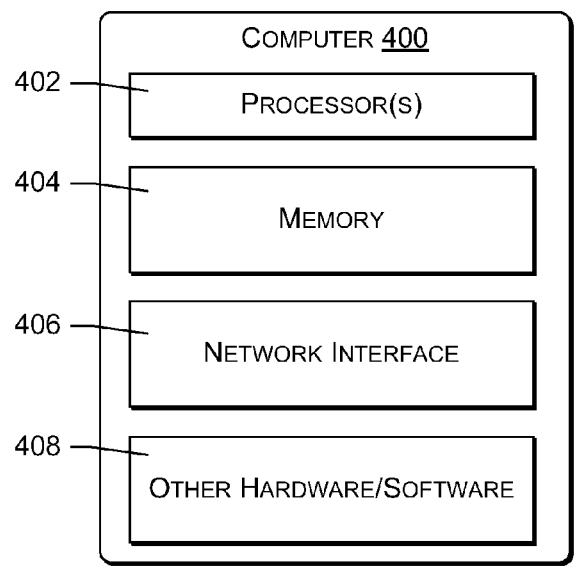
FIG. 4 is a block diagram showing high-level components of an example computer that may be configured and programmed to implement portions of the functionality described herein.

FIG. 4 illustrates relevant components of an example computer configuration that may be used to implement aspects of the functionality described above, including functionality attributed above to the various management components and status reporting service described with reference to FIG. 1. Generally, a server, service, client, browser, etc. may be implemented by one or more computers such as this, with the various management and administrative functionality described above distributed in various ways among one or more instances of such computers.

In a very basic configuration, an example computer 400 might comprise a processing unit 402 composed one of one or more processors, and memory 404. The memory 404 may comprise computer storage media and may include volatile and nonvolatile memory. Thus, the memory 404 may include, but is not limited to, RAM, ROM, EEPROM, flash memory, or other memory technology, or any other medium which can be used to store media items or applications and data which can be accessed by the computer 400.

The memory 404 may be used to store any number of functional components that are executable on the processing unit 402, as well as data that is used by the functional components. Functionality components (not shown) may include an operating system, a web services component, application program interfaces (APIs) and various other components as may be appropriate to implement the functionality described above.

The computer 400 may of course include many logical, programmatic, and physical components, of which those shown in FIG. 4 are merely examples that are related to the discussion herein. As an example, the computer 400 may have a network interface 406 for communicating over the network 126. Other hardware and software components of the computer 400 are represented by block 408 of FIG. 4, and may include the usual components of a network-based computer or server.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computer-implemented method, comprising:
   under control of one or more processors configured with executable instructions,
   scanning an identification tag that is physically associated with a data center resource;
   determining a resource identifier based at least in part on scanning the identification tag;
   based at least in part on the resource identifier, obtaining operational status of the data center resource, wherein the operational status at least indicates a number of users that are using the data center resource; and
   causing the operational status to be presented on a user interface.

2. The method of claim 1, wherein obtaining the operational status comprises monitoring a status logging service.

3. The method of claim 1, wherein the data center resource is one of a plurality of computers within a data center.

4. The method of claim 1, wherein the data center resource comprises a host and the operational status further indicates virtual machines that are running on the host on behalf of customers.

5. The method of claim 1, wherein the data center resource comprises a computer and the operational status further indicates processes running on the computer.

6. The method of claim 1, wherein the operational status further indicates customer codes corresponding to customers using the data center resource.

7. The method of claim 1, wherein the scanning and the presenting are performed with a mobile diagnostic device in physical proximity to the data center resource.

8. The method of claim 1, wherein the identification tag comprises an optical tag.

9. The method of claim 1, wherein the identification tag comprises a radio tag.

10. The method of claim 1, further comprising normalizing the operational status for presentation to at least two support personnel.

11. The method of claim 1, wherein the operational status further indicates whether the data center resource may be taken offline.

12. The method of claim 1, wherein the operational status further indicates one or more of the following:
    number of customers being supported by the data center resource;
    customers using or being supported by the data center resource;
    whether the data center resource is being used;
    whether the data center resource can be worked on;
    whether the data center resource can be taken offline;
    health of the data center resource;
    network parameters of the data center resource;
    hardware identification of the data center resource;
    whether the data center resource is live;
    performance metrics of the data center resource;
    diagnostics associated with the data center resource;
    metadata associated with the data center resource;
    pending or requested actions that are to be taken with respect to the data center resource;
    service, event, and error histories;
    other historical data regarding the data center resource; or
    log data associated with the data center resource.

13. One or more computer-readable media containing instructions that are executable by one or more processors to perform actions comprising:
    receiving a resource identifier that has been scanned from a data center resource;
    based at least in part on the resource identifier, querying one or more data center administrative components to determine operational status of the data center resource; and
    communicating the determined operational status via a user interface.

14. The one or more computer-readable media of claim 13, the actions further comprising indicating pending actions that are to be taken with respect to the data center resource.

15. The one or more computer-readable media of claim 13, wherein the data center resource is one of a plurality of computers within a data center.

16. The one or more computer-readable media of claim 13, the actions further comprising scanning the data center resource to identify the resource identifier.

17. The one or more computer-readable media of claim 13, further comprising normalizing the operational status before communicating the operational status via the user interface.

18. The one or more computer-readable media of claim 13, wherein the operational status indicates one or more of the following:
- number of customers using or being supported by the data center resource;
- customers using or being supported by the data center resource;
- whether the data center resource is being used;
- whether the data center resource can be worked on;
- whether the data center resource can be taken offline;
- health of the data center resource;
- network parameters of the data center resource;
- hardware identification of the data center resource;
- whether the data center resource is live;
- performance metrics of the data center resource;
- diagnostics associated with the data center resource;
- metadata associated with the data center resource;
- pending or requested actions that are to be taken with respect to the data center resource;
- service, event, and error histories;
- other historical data regarding the data center resource; or
- log data associated with the data center resource.

19. A handheld device for use within a data center by a data center technician, the data center containing a plurality of resources that are physically accessible to the data center technician, the handheld device comprising:
- one or more processors;
- memory containing instructions that are executable by the one or more processors to perform actions comprising:
  - physically scanning a resource to identify the resource;
  - based at least in part on identifying the resource, obtaining operational status of the resource, wherein the operational status at least indicates that users are using the resource; and
  - displaying the operational status on a display of the handheld device.

20. The handheld device of claim 19, wherein physically scanning the resource comprises scanning an optical image affixed to the resource.

21. The handheld device of claim 19, wherein physically scanning the resource comprises reading a radio identification tag affixed to the resource.

22. The handheld device of claim 19, wherein the operational status further indicates one or more of the following:
- number of customers using or being supported by the resource;
- customers being supported by the resource;
- whether the resource is being used;
- whether the resource can be worked on;
- whether the resource can be taken offline;
- health of the resource;
- network parameters of the resource;
- hardware identification of the resource;
- whether the resource is live;
- performance metrics of the resource;
- diagnostics associated with the resource;
- metadata associated with the resource;
- pending or requested actions that are to be taken with respect to the resource;
- service, event, and error histories;
- other historical data regarding the resource; or
- log data associated with the resource.

23. The handheld device of claim 19, wherein the resource is one of a plurality of computers within the data center.

24. The handheld device of claim 19, wherein the resource comprises a host and the operational status further indicates virtual machines running on the host on behalf of customers.

25. The handheld device of claim 19, wherein the resource comprises a computer and the operational status further indicates processes running on the computer.

26. The handheld device of claim 19, wherein the operational status further indicates customer codes corresponding to customers using the resource.

* * * * *